United States Patent
Kim et al.

(10) Patent No.: US 11,594,906 B2
(45) Date of Patent: Feb. 28, 2023

(54) BATTERY CHARGING METHOD AND CHARGING SYSTEM FOR CHARGING A BATTERY WITH A REST PERIOD

(71) Applicant: Samsung SDI Co., Ltd., Yongin-si (KR)

(72) Inventors: Dong Rak Kim, Yongin-si (KR); Jung Gun Park, Yongin-si (KR); Jung Pil Park, Yongin-si (KR)

(73) Assignee: Samsung SDI Co., Ltd., Gyeonggi-do (KR)

( * ) Notice: Subject to any disclaimer, the term of this patent is extended or adjusted under 35 U.S.C. 154(b) by 535 days.

(21) Appl. No.: 16/505,258

(22) Filed: Jul. 8, 2019

(65) Prior Publication Data

US 2019/0334355 A1 Oct. 31, 2019

Related U.S. Application Data

(63) Continuation of application No. PCT/KR2017/012889, filed on Nov. 14, 2017.

(30) Foreign Application Priority Data

Jan. 23, 2017 (KR) .................. 10-2017-0010200

(51) Int. Cl.
*H02J 7/00* (2006.01)

(52) U.S. Cl.
CPC ............ *H02J 7/007* (2013.01); *H02J 7/0071* (2020.01); *H02J 7/007194* (2020.01)

(58) Field of Classification Search
CPC .. H02J 7/007; H02J 7/00711; H02J 7/007192; H02J 7/007194

USPC ........................................................ 320/160
See application file for complete search history.

(56) References Cited

U.S. PATENT DOCUMENTS

| | | | | |
|---|---|---|---|---|
| 6,366,056 | B1* | 4/2002 | Podrazhansky | H01M 10/44 320/141 |
| 9,490,642 | B2* | 11/2016 | Kim | H02J 7/00712 |
| 2005/0099162 | A1* | 5/2005 | Ding | H02J 7/00711 320/141 |

(Continued)

FOREIGN PATENT DOCUMENTS

| | | |
|---|---|---|
| EP | 2 947 748 A1 | 11/2015 |
| JP | 2007-311107 A | 11/2007 |

(Continued)

OTHER PUBLICATIONS

International Search Report dated Feb. 21, 2018 for International Patent Application No. PCT/KR2017/012889.

*Primary Examiner* — Nathaniel R Pelton
(74) *Attorney, Agent, or Firm* — Knobbe, Martens, Olson & Bear, LLP (57) ABSTRACT

The present application relates to a battery charging method and charging system which can prevent degradation of a battery and enhance the lifetime characteristics thereof. In one aspect, the charging method includes charging a battery at a first C-rate higher than a reference C-rate, wherein the C-rate represents charge or discharge current/a rated capacity of the battery. The charging method also includes charging the battery at a second C-rate lower than the reference C-rate. The charging of the battery at the first C-rate includes at least one rest period for temporarily stopping the charging of the battery.

17 Claims, 6 Drawing Sheets

(56) References Cited

U.S. PATENT DOCUMENTS

| | | | |
|---|---|---|---|
| 2011/0279092 A1* | 11/2011 | Sutarwala | H02J 7/0091 320/150 |
| 2014/0077815 A1* | 3/2014 | Mattisson | G01R 31/367 324/426 |
| 2014/0266068 A1* | 9/2014 | O'Brien | B60L 58/21 320/139 |
| 2014/0375275 A1* | 12/2014 | Hung | B60L 53/11 320/139 |
| 2015/0022160 A1* | 1/2015 | Greening | H01M 10/48 320/162 |
| 2015/0077058 A1 | 3/2015 | Jung et al. | |
| 2015/0123621 A1 | 5/2015 | Kim et al. | |
| 2015/0377976 A1* | 12/2015 | Maluf | H02J 7/005 702/63 |
| 2017/0338667 A1* | 11/2017 | Loonen | H02J 7/007 |

FOREIGN PATENT DOCUMENTS

| | | |
|---|---|---|
| KR | 10-1997-0018830 A | 4/1997 |
| KR | 10-2011-0024707 A | 3/2011 |
| KR | 10-2013-0137560 A | 12/2013 |
| KR | 10-1502230 B1 | 3/2015 |
| KR | 10-2015-0084625 A | 7/2015 |
| KR | 10-2016-0121200 A | 10/2016 |

\* cited by examiner

BATTERY CHARGING METHOD AND CHARGING SYSTEM FOR CHARGING A BATTERY WITH A REST PERIOD

CROSS-REFERENCE TO RELATED APPLICATIONS

This application is a continuation application and claims the benefit under 35 U.S.C. §§ 120 and 365 of PCT Application No. KR2017/012889, filed on Nov. 14, 2017, which is hereby incorporated by reference. KR2017/012889 also claimed priority to Korean Patent Application No. 10-2017-0010200 filed on Jan. 23, 2017, which is hereby incorporated by reference.

BACKGROUND

Field

The described technology generally relates to a charging method of battery and a battery charging system.

Description of Related Technology

Recently, as demand for portable electronic devices, e.g., laptops and smartphones, has increased, demand has simultaneously increased for secondary or rechargeable batteries.

It can be repeatedly used by recharging after the battery has been discharged. Thus, performance varies depending on the charge/discharge state. Accordingly, efforts have been made to enhance the performance of these batteries by improving the charging method.

SUMMARY OF CERTAIN INVENTIVE EMBODIMENTS

One inventive aspect is a battery charging method and charging system, which can enhance lifetime characteristics of a battery by preventing degradation of the battery.

Another aspect is a battery charging method that may include a high-rate charging step for charging a battery at a C-rate higher than a reference C-rate, and a low-rate charging step for charging the battery at a C-rate lower than the reference C-rate, wherein, in the high-rate charging step, a rest period for stopping charging the battery is allowed at least once.

A time point of allowing the rest period may correspond to a time point in which a temperature variation of the battery is higher than a reference value.

In addition, a time point of allowing the rest period may correspond to a time point in which C-rates of the battery are changed.

Another aspect is a battery charging method may include a high-rate charging step for charging a battery at a C-rate higher than a reference C-rate and a low-rate charging step for charging the battery at a C-rate lower than the reference C-rate, wherein a rest period for stopping charging the battery is allowed at time points when C-rates are changed in the high-rate charging step and the low-rate charging step.

In the high-rate charging step, a rest period for stopping charging the battery may allow at least once.

In addition, a time point of allowing the rest period may correspond to a time point in which a temperature variation of the battery is higher than a reference value.

In accordance with another aspect of the present invention, a battery charging system may include a main control unit (MCU) for controlling a battery and charging of the battery, wherein the MCU first charges the battery at a C-rate higher than a reference C-rate and then allows a rest period for stopping charging the battery at least once in a section in which the battery is charged at a C-rate higher than the reference C-rate.

The MCU may include a sensing unit sensing voltages and currents of the battery; a charge current supply unit supplying charge current of the battery; and a control unit receiving information from the sensing unit and controlling the charge current supply unit.

If a temperature variation of the battery is higher than a reference value, the control unit may give a rest command for stopping charging the battery to the charge current supply unit.

The control unit may give a rest command for stopping charging the battery to the charge current supply unit at a time point when C-rates are changed.

Another aspect is a battery charging method comprising: charging a battery at a first C-rate higher than a reference C-rate, wherein the C-rate represents the ratio of charge or discharge current to a rated capacity of the battery; and charging the battery at a second C-rate lower than the reference C-rate, wherein the charging of the battery at the first C-rate includes at least one rest period for temporarily stopping the charging of the battery.

In the above battery charging method, a time point of the rest period corresponds to a time point in which a temperature variation of the battery is higher than a reference value. In the above battery charging method, a time point of the rest period corresponds to a time point in which C-rates of the battery are changed. In the above battery charging method, the charging of the battery at the first C-rate comprises a plurality of sections at least two of which have different C-rates and capacities. In the above battery charging method, one or more of the plurality of sections include at least one rest period for temporarily stopping the charging of the battery.

In the above battery charging method, at least one of the plurality of sections includes more than two rest periods for temporarily stopping the charging of the battery. In the above battery charging method, one of the plurality of sections includes no rest period for temporarily stopping the charging of the battery. In the above battery charging method, the charging of the battery at the second C-rate comprises a plurality of sections at least two of which have different C-rates and capacities.

Another aspect is a battery charging method comprising: charging a battery at a first C-rate higher than a reference C-rate, wherein the C-rate represents the ratio of charge or discharge current to a rated capacity of the battery; second charging the battery at a second C-rate lower than the reference C-rate; and providing a rest period for temporarily stopping the charging of the battery at time points when C-rates are changed in the charging of the battery at the first C-rate and the charging of the battery at the second C-rate.

In the above battery charging method, the rest period is provided at least once. In the above battery charging method, a time point of the rest period corresponds to a time point in which a temperature variation of the battery is higher than a reference value. In the above battery charging method, the rest period is provided in the charging of the battery at the first C-rate at least once. In the above battery charging method, the rest period is provided in the charging of the battery at the second C-rate at least once.

Another aspect is a battery charging system comprising: a main controller configured to control a battery and a charging operation of the battery, wherein the main controller is configured to first charge the battery at a first C-rate higher than a reference C-rate and then allow a rest period for temporarily stopping the charging of the battery at least once in a section in which the battery is charged at the first C-rate, wherein the C-rate represents charge or discharge current/a rated capacity of the battery.

In the above battery charging system, the main controller comprises: a sensor configured to sense voltages and currents of the battery; a charge current supply configured to supply charge current of the battery; and a controller configured to receive information from the sensor and control the charge current supply. In the above battery charging system, the controller is configured to output a rest command, for temporarily stopping the charging of the battery, to the charge current supply, in response to a temperature variation of the battery being higher than a reference value.

In the above battery charging system, the controller is configured to output a rest command, for temporarily stopping the charging of the battery, to the charge current supply at a time point when C-rates are changed. In the above battery charging system, the main controller is configured to second charge the battery at a second C-rate lower than the reference C-rate after the first charging. In the above battery charging system, the main controller is configured to provide the rest period in the second charging at least once. In the above battery charging system, the main controller is configured to provide the rest period at time points when C-rates are changed in the first charging and the second charging.

According to at least one of the disclosed embodiments, in a high-rate charging step for charging a battery at a C-rate higher than a reference C-rate, a rest period for stopping charging the battery is allowed at least once, thereby enhancing the lifetime characteristics of the battery by preventing degradation of the battery.

In addition, a rest period for stopping charging the battery is allowed at a time point when C-rates are changed, thereby enhancing the lifetime characteristics of the battery by preventing degradation of the battery.

DETAILED DESCRIPTION OF CERTAIN INVENTIVE EMBODIMENTS

A secondary battery can be charged by a constant current-constant voltage (CC-CV) charging method. For example, at an initial charging stage, constant current (CC) charging is first performed, and when a charging voltage reaches a preset voltage, charging is performed with the constant voltage so as to maintain the preset voltage. Additionally, in order to achieve fast charging by the CC-CV charging method, the C-rate of the CC charging should be set to be high. However, the higher the C-rate is, the greater the heat dissipation and the rate of degradation of the secondary battery may be. Consequently, the output and capacity of the secondary battery may be reduced which is undesirable.

Hereinafter, embodiments of the described technology will be described in detail.

Various embodiments of the described technology may be embodied in many different forms and should not be construed as being limited to the example embodiments set forth herein. Rather, these example embodiments of the disclosure are provided so that this disclosure will be thorough and complete and will convey inventive concepts of the disclosure to those skilled in the art.

In the accompanying drawings, sizes or thicknesses of various components are exaggerated for brevity and clarity. Like numbers refer to like elements throughout. As used herein, the term "and/or" includes any and all combinations of one or more of the associated listed items. In addition, it will be understood that when an element A is referred to as being "connected to" an element B, the element A can be directly connected to the element B or an intervening element C may be present and the element A and the element B are indirectly connected to each other.

The terminology used herein is for the purpose of describing particular embodiments only and is not intended to be limiting of the disclosure. As used herein, the singular forms are intended to include the plural forms as well, unless the context clearly indicates otherwise. It will be further understood that the terms "comprise or include" and/or "comprising or including," when used in this specification, specify the presence of stated features, numbers, steps, operations, elements, and/or components, but do not preclude the presence or addition of one or more other features, numbers, steps, operations, elements, components, and/or groups thereof.

It will be understood that, although the terms first, second, etc. may be used herein to describe various members, elements, regions, layers and/or sections, these members, elements, regions, layers and/or sections should not be limited by these terms. These terms are only used to distinguish one member, element, region, layer and/or section from another. Thus, for example, a first member, a first element, a first region, a first layer and/or a first section discussed below could be termed a second member, a second element, a second region, a second layer and/or a second section without departing from the teachings of the present disclosure.

Figure 1:
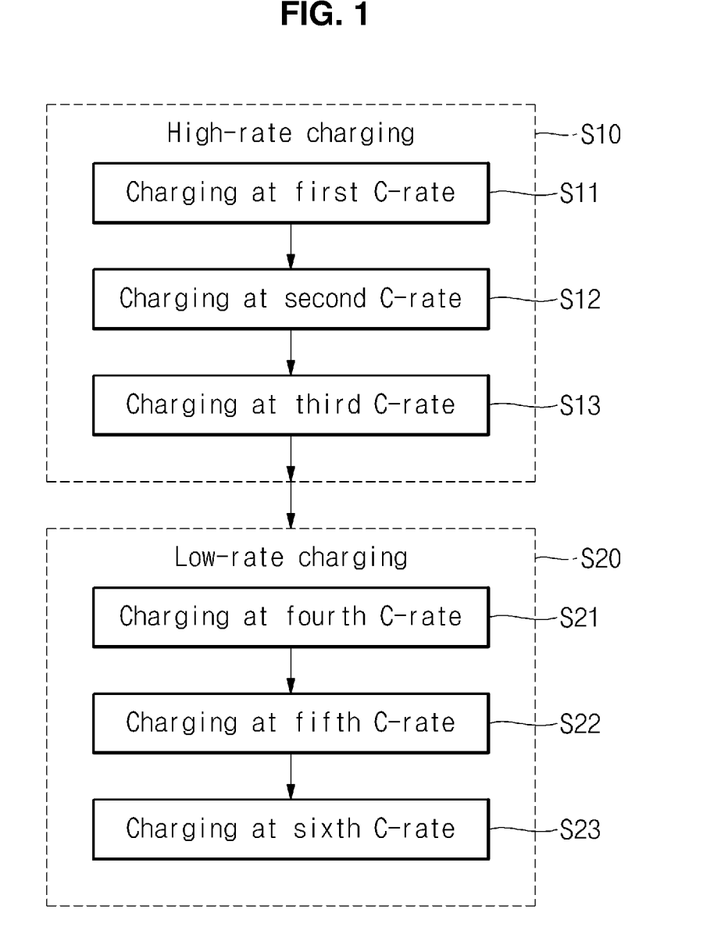
FIG. 1 is a flowchart illustrating a battery charging method according to an embodiment of the described technology.
Figure 2:
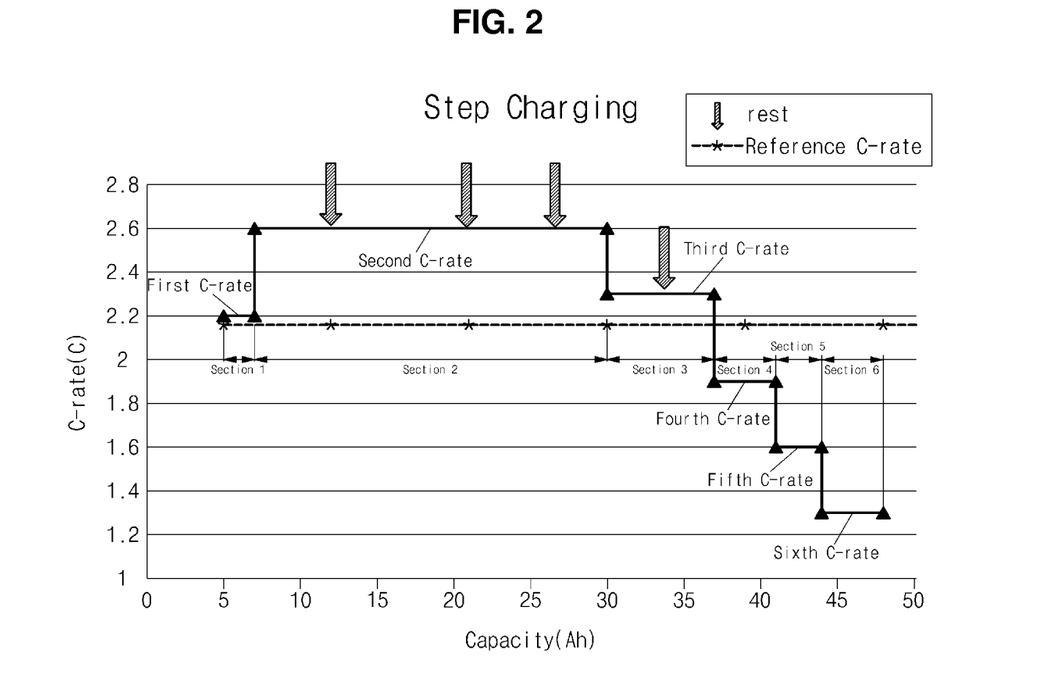
FIGS. 2 to 4 are graphs illustrating capacity versus C-rate relationships in the battery charging method according to an embodiment of the described technology.
Figure 3:
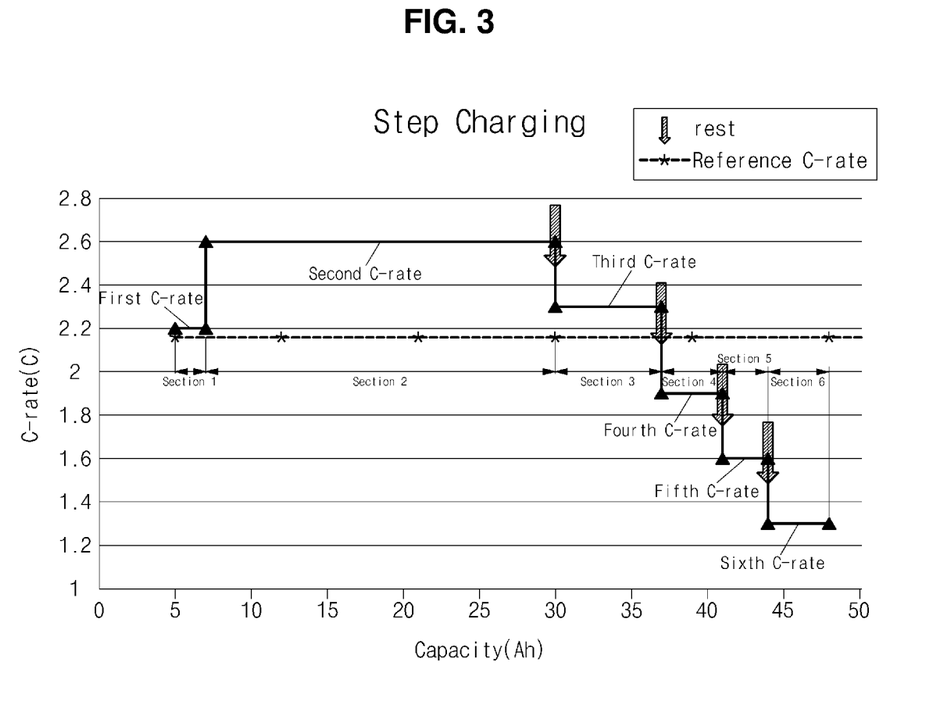
Figure 4:
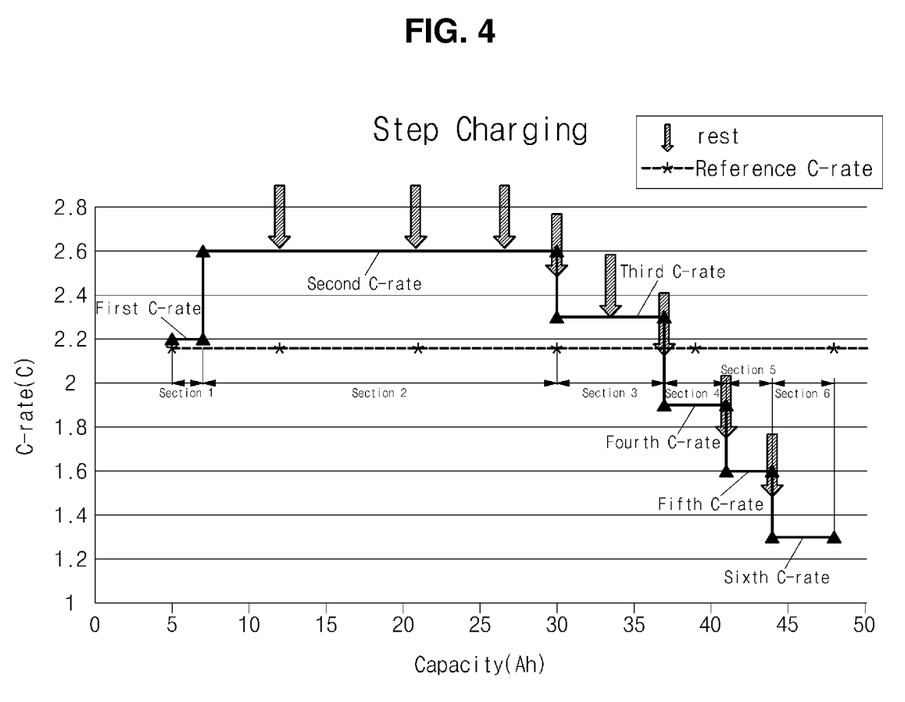

FIG. 1 is a flowchart illustrating a battery charging method according to an embodiment of the described technology. FIGS. 2 to 4 are graphs illustrating capacity versus C-rate relationships in the battery charging method according to an embodiment of the described technology.

The term "C-rate (current rate)" used in the described technology represents a unit for setting a current value under various using conditions during charging and discharging of a battery and for estimating or denoting an available using time of the battery. A current value according to a charge and discharge rate may be may be calculated by dividing a charge or discharge current by the rated capacity of the battery. The symbol "C" is used as the unit of the C-rate and may be defined by the following equation (1):

$$C\text{-rate} = \text{Charge or discharge current/a rated capacity of the battery (or the ratio of charge or discharge current to a rated capacity of the battery)} \qquad (1)$$

Referring to FIG. 1, charging is performed in such a manner that C-rates are gradually stepped down. Although the flowchart of FIG. 1 is described herein with reference to a particular order, in various embodiments, states herein can be performed in a different order, or omitted, and additional states can be added. The battery charging method can be a rapid charging method in which a battery is charged at high C-rates at an early charging stage and then charged while gradually reducing C-rates step by step.

In some embodiments, the battery charging method includes high-rate charging (first charging or initial charging) (S10) for charging the battery at a higher C-rate than a reference C-rate and low-rate charging (S20) for charging the battery at a lower C-rate than the reference C-rate. In addition, the high-rate charging (S10) and the low-rate charging (S20) may be divided into multiple sub-operations, respectively.

For example, the high-rate charging (S10) may include charging the battery at a first C-rate (S11), charging the battery at a second C-rate higher than the first C-rate (S12), and charging the battery at a third C-rate lower than the second C-rate (S13). Here, the first, second and third C-rates are all higher than the reference C-rate. When the reference C-rate is less than 2.2 C, the first C-rate may be 2.2 C, the second C-rate may be 2.6 C, and the third C-rate may be 2.3 C, but aspects of the described technology are not limited thereto. For example, at least one of the first, second and third C-rates can be greater than 2.6 C. Also, the reference C-rate can have other values, for example, less than 2 C.

In addition, the low-rate charging (second or subsequent charging) (S20) may include charging the battery at a fourth C-rate lower than the third C-rate (S21), charging the battery at a fifth C-rate lower than the fourth C-rate (S22), and charging the battery at a sixth C-rate lower than the fifth C-rate (S23). Here, the fourth, fifth and sixth C-rates are all lower than the reference C-rate. When the reference C-rate is greater than 2 C, the fourth C-rate may be 1.9 C, the fifth C-rate may be 1.6 C, and the sixth C-rate may be 1.3 C, but aspects of the described technology are not limited thereto. For example, at least one of the fourth, fifth and sixth C-rates can be less than 1.3 C. Also, the reference C-rate can have other values, for example, less than 2 C.

Meanwhile, when the battery is rapidly charged, the amount of heat generated from the battery may increase in the high-rate charging (S10) in which the battery is charged at relatively high C-rates, so that the battery may be rapidly degraded. Therefore, in some embodiments of the described technology, as shown in FIG. 2, in the high-rate charging (S10), a rest period for temporarily stopping charging the battery is provided at least once to reduce a temperature change of the battery, thereby preventing the battery from being degraded. A time point of giving the rest period in the high-rate charging (S10) can be when the battery undergoes a considerable temperature change. For example, if the temperature change of the battery in the high-rate charging (S10) is higher than a reference value, the rest period is given to temporarily stop charging the battery. Here, the rest period may be set to less than several seconds. For example, the rest period can be set about two, three, four or five seconds, or less than about one second. The numbers of the rest periods shown in FIG. 2 are examples only, and other numbers of rest periods are also possible. For example, in FIG. 2, one, two, four or more rest periods can be provided in the section 2, and two or more rest periods can be provided in the section 3. Furthermore, the same or different intervals between rest periods are also possible. The same rationale can be applied to FIGS. 3 and 4.

In addition, when the battery is rapidly charged, the amount of heat generated from the battery may increase in sections in which C-rates are changed. Therefore, in some embodiments of the described technology, as shown in FIG. 3, a rest period may be provided in each of the sections in which C-rates are changed to reduce a temperature change, thereby preventing the battery from being degraded. Accordingly, the battery charging method according to some embodiments can enhance lifetime characteristics of the battery. For example, a rest period may be provided between the second charging (S21) and the third charging (S13). In addition, rest periods may also be provided between the third charging (S13) and the fourth charging (S21) for charging the battery at the fourth C-rate, between the fourth charging (S21) and the fifth charging (S22) for charging the battery at the fifth C-rate, and between the fifth charging (S22) and the sixth charging (S23) for charging the battery at the sixth C-rate.

In addition, in some embodiments of the described technology, as shown in FIG. 4, the rest period is provided in each section in which C-rates are changed as well as in the high-rate charging (S10). Accordingly, a charging period in such a pattern as shown in FIG. 4 may become slightly longer than in such patterns as shown in FIGS. 2 and 3, but lifetime characteristics of the battery may be further enhanced.

Figure 5:
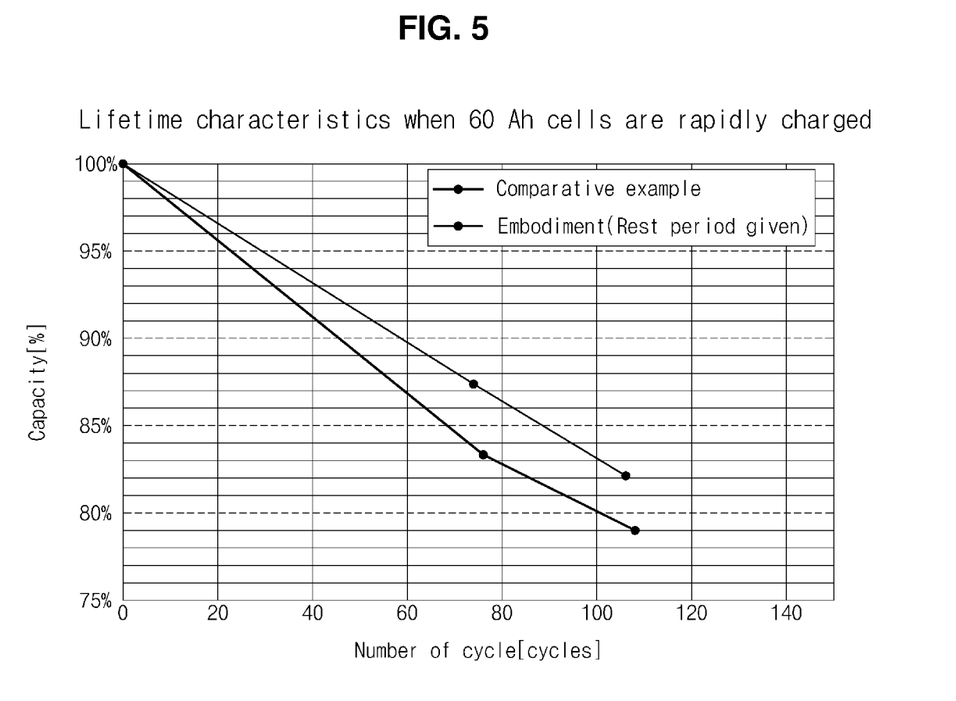
FIG. 5 is a graph illustrating comparison results of a lifetime of a battery when a rest period is allowed by a battery charging method according to an embodiment of the described technology and a lifetime of a battery when a rest period is not allowed.

FIG. 5 is a graph illustrating comparison results of a lifetime of a battery when a rest period is allowed by a battery charging method according to an embodiment of the described technology and a lifetime of a battery when a rest period is not allowed.

As shown in FIG. 5, batteries of the same type are rapidly charged more than 100 times in a step-down manner, and lifetime characteristics thereof are measured for comparison when a rest period is given to one battery (the described technology) in high-rate charging and in each section in which C-rates are changed, while a rest period is not provided to the other battery (comparative invention). As a result, an embodiment, to which the rest period is provided in the high-rate charging and in each section in which C-rates are changed, demonstrated a better lifetime characteristic of about 3% to about 4% than the comparative example, to which the rest period is not provided.

As described above, in the battery charging method according to an embodiment of the described technology, a rest period for stopping charging the battery is provided at least once in a high-rate charging in which the C-rate is higher than a reference C-rate, thereby enhancing the lifetime characteristics of the battery by preventing degradation of the battery.

In addition, in the battery charging method according to an embodiment of the described technology, a rest period for stopping charging the battery is provided in a section in which C-rates are changed, thereby enhancing the lifetime characteristics of the battery by preventing degradation of the battery.

Figure 6:
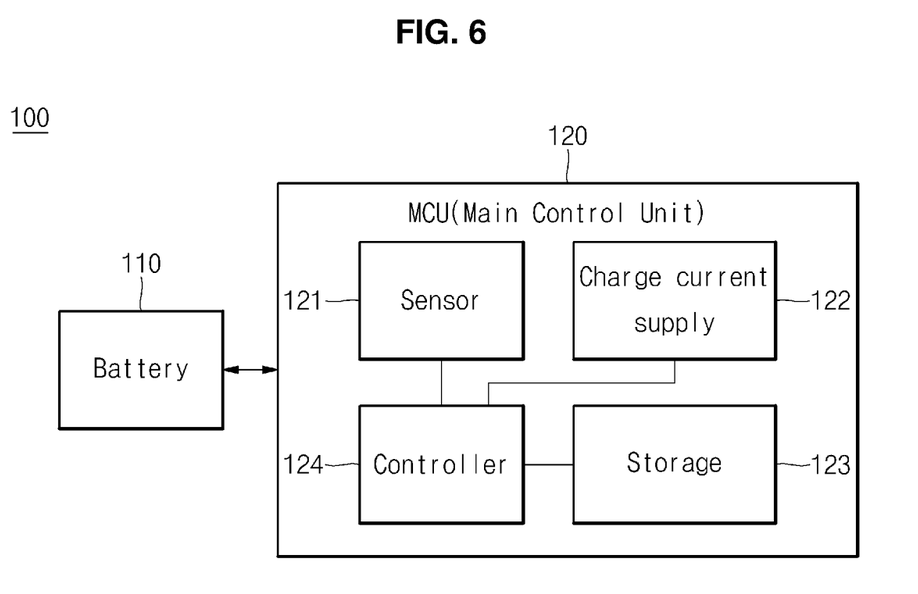
FIG. 6 is a block diagram of a battery charging system according to an embodiment of the described technology.

FIG. 6 is a block diagram of a battery charging system according to an embodiment of the described technology.

As shown in FIG. 6, the battery charging system 100 according to the described technology includes a battery 110 and a main control unit or main controller (MCU) 120 for controlling charging of the battery 110. This configuration may also be defined as a battery pack.

The battery 110 may be a general rechargeable battery, for example, a lithium ion battery, a lithium ion polymer battery, or the like. The battery 110 may include multiple battery cells connected in series or in parallel.

The MCU 120 includes a sensor 121, a charge current supply 122, a storage 123 and a controller 124.

The sensor 121 is electrically connected to the battery 110 to sense the voltage or current of the battery 110 and converts the sensed voltage or current into a digital signal to then transmit the digital signal to the controller 124.

The charge current supply 122 supplies charge currents according to charging sections to charge the battery 110. Charge current data according to the charging sections of the battery 110 may be pre-stored in the storage 123 in the form of a lookup table.

As described above, the storage 123 may store the first to sixth C-rates for charging the battery 110 and a reference C-rate. In addition, the stored information can be provided to the controller 124. In addition, the storage 123 may store software or a program for implementing the charging method shown in FIG. 1.

The controller 124 may receive the information concerning the voltage or current of the battery 110 from the sensor 121 and may command the charge current supply 122 to charge the battery 110. In addition, the controller 124 may receive the information concerning the temperature of the battery 110 from the sensor 121 to output a rest command to the charge current supply 122 to stop charging the battery 110. For example, the controller 124 may receive a temperature variation of battery 110 from the sensor 121 and, if the temperature variation is greater than a reference valve, may apply a rest command to the charge current supply 122 to temporarily stop charging the battery 110. Here, the rest period may be set to less than several seconds.

In addition, while the sensor 121 and the charge current supply 122 can be controlled by the controller 124 of the MCU 120, a separate analog front end may be installed to control the sensor 121 and the charge current supply 122 as the number of battery cells is increased. Moreover, the MCU 120 and the analog front end may be separately provided or may be implemented as a single chip.

Meanwhile, FIG. 6 shows only some components of a battery pack, but various types of components may be additionally provided. Furthermore, certain elements can be removed, two or more elements combined or one element can be separated into multiple elements depending on the specification and requirements. In an example, various configurations including a charge control switch (not shown) for controlling charge current, a discharge control switch (not shown) for controlling discharge current, and so on, may be additionally provided.

The charging method of the battery charging system having the aforementioned configuration will now be described.

Referring to FIGS. 1 and 4, the battery is charged in a step-down manner. First, if charging of the battery 110 is started, the controller 124 commands the charge current supply 122 to charge the battery 110 at the first C-rate during a first section. Then, the charge current supply 122 supplies the battery 110 with current at the first C-rate to charge the battery 110 during the first section (S11).

Next, the controller 124 commands the charge current supply 122 to charge the battery 110 at the second C-rate higher than the first C-rate during a second section. Then, the charge current supply 122 supplies current to the battery 110 at the second C-rate to charge the battery 110 during the second section (S12). In addition, the controller 124 receives information concerning the temperature of the battery 110 from the sensor 121 in the second section, and if a temperature variation of the battery 110 is greater than a reference value, outputs a rest command to the charge current supply 122. If the charge current supply 122 receives the rest command from the controller 124, charging of the battery 110 is temporarily stopped. Additionally, if the second section is terminated, the controller 124 outputs the rest command to the charge current supply 122 to temporarily stop charging the battery 110.

Next, the controller 124 commands the charge current supply 122 to charge the battery 110 at the third C-rate lower than the second C-rate during a third section. Then, the charge current supply 122 supplies the battery 110 with current at the third C-rate to charge the battery 110 during the third section (S13). In addition, the controller 124 may receive information concerning the temperature of the battery 110 from the sensor 121 in the third section, and if a temperature variation of the battery 110 is greater than the reference value, may apply a rest command to the charge current supply 122 to temporarily stop charging the battery 110. Additionally, if the third section is terminated, the controller 124 outputs the rest command to the charge current supply 122 to temporarily stop charging the battery 110. The first to third sections correspond to the high-rate charging (S10).

Next, the controller 124 commands the charge current supply 122 to charge the battery 110 at a fourth C-rate lower than the third C-rate during a fourth section. Then, the charge current supply 122 supplies the battery 110 with current at the fourth C-rate to charge the battery 110 during the fourth section (S21). Additionally, if the fourth section is terminated, the controller 124 outputs the rest command to the charge current supply 122 to temporarily stop charging the battery 110.

Next, the controller 124 commands the charge current supply 122 to charge the battery 110 at a fifth C-rate lower than the fourth C-rate during a fifth section. Then, the charge current supply 122 supplies the battery 110 with current at the fifth C-rate to charge the battery 110 during the fifth section (S22). Additionally, if the fifth section is terminated, the controller 124 applies the rest command to the charge current supply 122 to temporarily stop charging the battery 110.

Finally, the controller 124 commands the charge current supply 122 to charge the battery 110 at a sixth C-rate lower than the fifth C-rate during a sixth section. Then, the charge current supply 122 supplies the battery 110 with current at the sixth C-rate to charge the battery 110 during the sixth section (S23). The fourth to sixth sections correspond to the low-rate charging (S20).

As described above, the battery charging system according to embodiments of the described technology charges the battery in a step-down manner in which charging is performed while gradually stepping down C-rates and provides a rest period for stopping charging the battery at least once in a high-rate charging step in which the C-rate is higher than a reference C-rate, thereby enhancing the lifetime characteristics of the battery by preventing degradation of the battery.

In addition, the battery charging system according to embodiments of the described technology provides a rest period for stopping charging the battery in a section in which C-rates are changed, thereby enhancing the lifetime characteristics of the battery by preventing degradation of the battery.

Although the foregoing embodiments have been described to practice the battery charging method and a battery charging system of the described technology, the disclosed embodiments are set forth for illustrative purposes and do not serve to limit the invention. Those skilled in the art will readily appreciate that many modifications and variations can be made, without departing from the spirit and scope of the invention as defined in the appended claims, and such modifications and variations are encompassed within the scope and spirit of the present invention.

What is claimed is:

1. A battery charging method comprising:
charging a battery in an initial charging including charging the battery at a first plurality of C-rates, each of the first plurality of C-rates is higher than a reference C-rate, wherein the C-rate represents the ratio of charge or discharge current to a rated capacity of the battery, wherein the first plurality of C-rates include a first C-rate and a second C-rate higher than the first C-rate, and wherein charging the battery at the second C-rate is performed after charging the battery at the first C-rate;
charging the battery in a subsequent charging including charging the battery at a second plurality C-rates, each of the second plurality of C-rates is lower than the reference C-rate; and
receiving a variation in a temperature of the battery from a sensor,
wherein charging the battery in the initial charging includes at least one rest period for temporarily stopping the charging of the battery, and
wherein the rest period begins when the received temperature variation of the battery is higher than a reference value.

2. The battery charging method of claim 1, wherein a time point of the rest period corresponds to a time point in which C-rates of the battery are changed.

3. The battery charging method of claim 1, wherein charging the battery at the second C-rate includes more than two rest periods for temporarily stopping the charging of the battery.

4. The battery charging method of claim 1, wherein charging the battery at the first C-rate includes no rest period for temporarily stopping the charging of the battery.

5. The battery charging method of claim 1, wherein the at least one rest period comprises a plurality of rest periods defining intervals therebetween, and wherein at least two of the intervals have different lengths.

6. The battery charging method of claim 1, wherein the second plurality of C-rates include a third C-rate, a fourth C-rate lower than the third C-rate, and a fifth C-rate lower than the fourth C-rate, wherein charging the battery at the fourth C-rate is performed after charging the battery at the third C-rate, and wherein charging the battery at the fifth C-rate is performed after charging the battery at the fourth C-rate.

7. A battery charging method comprising:
charging a battery in an initial charging including charging the battery at a first plurality of C-rates, each of the first plurality of C-rates is higher than a reference C-rate, wherein the C-rate represents the ratio of charge or discharge current to a rated capacity of the battery, wherein the first plurality of C-rates include a first C-rate and a second C-rate higher than the first C-rate, and wherein charging the battery at the second C-rate is performed after charging the battery at the first C-rate;
subsequent to charging the battery in the initial charging, charging the battery in a subsequent charging including charging the battery at a second plurality C-rates, wherein each of the second plurality of C-rates is lower than the reference C-rate;
providing a rest period for temporarily stopping the charging of the battery at time points when C-rates are changed in the charging of the battery in the initial charging and the charging of the battery in the subsequent charging; and
receiving a variation in a temperature of the battery from a sensor,
wherein the rest period beings when the received temperature variation of the battery is higher than a reference value.

8. The battery charging method of claim 7, wherein the rest period is provided at least once.

9. The battery charging method of claim 7, wherein the rest period is provided in the charging of the battery at the first C-rate at least once.

10. The battery charging method of claim 7, wherein the rest period is provided in the charging of the battery at the second C-rate at least once.

11. A battery charging system comprising:
a main controller configured to control a battery and a charging operation of the battery, wherein the main controller is configured to first charge the battery in an initial charging including charging the battery at a first plurality of C-rates, each of the first plurality of C-rates is higher than a reference C-rate and then allow a rest period for temporarily stopping the charging of the battery while charging the battery at one of the first plurality of C-rates, wherein the C-rate represents charge or discharge current/a rated capacity of the battery, wherein the first plurality of C-rates include a first C-rate and a second C-rate higher than the first C-rate, wherein the main controller is configured to charge the battery at the second C-rate after charging the battery at the first C-rate, and
wherein the main controller is further configured to receive a variation in a temperature of the battery from a sensor, and control the battery and the charging operation of the battery such that the rest period beings when the received temperature variation of the battery is higher than a reference value.

12. The battery charging system of claim 11, wherein the main controller comprises:
the sensor configured to sense voltages and currents of the battery;
a charge current supply configured to supply charge current of the battery; and
a controller configured to receive information from the sensor and control the charge current supply.

13. The battery charging system of claim 12, wherein the controller is configured to output a rest command, for temporarily stopping the charging of the battery, to the charge current supply, in response to the temperature variation of the battery being higher than the reference value.

14. The battery charging system of claim 12, wherein the controller is configured to output a rest command, for temporarily stopping the charging of the battery, to the charge current supply at a time point when C-rates are changed.

15. The battery charging system of claim 11, wherein the main controller is configured to, subsequent to charging the battery at the first C-rate, charge the battery at a second C-rate lower than the reference C-rate after the first charging.

16. The battery charging system of claim 15, wherein the main controller is configured to provide the rest period in the second charging at least once.

17. The battery charging system of claim 15, wherein the main controller is configured to provide the rest period at time points when C-rates are changed in the first charging and the second charging.

* * * * *